(No Model.)

G. E. NUEBLING.
Punching Device.

No. 236,956. Patented Jan. 25, 1881.

Witnesses
Frank P. Kinsey
Frank Schmaust

Inventor
George E. Nuebling
pr Thomas P. Kinsey
Atty

UNITED STATES PATENT OFFICE.

GEORGE E. NUEBLING, OF READING, PENNSYLVANIA, ASSIGNOR OF ONE-HALF TO FRANCIS I. OBART, OF SAME PLACE.

PUNCHING DEVICE.

SPECIFICATION forming part of Letters Patent No. 236,956, dated January 25, 1881.

Application filed March 18, 1880. (No model.)

*To all whom it may concern:*

Be it known that I, GEORGE ERNST NUEBLING, of the city of Reading, county of Berks, State of Pennsylvania, have invented a new and useful Improvement in the Construction of Portable Hand-Punches for Boiler-Makers, of which the following is a specification.

This invention relates to a modification of the screw and its connection with the punch, and is applicable to all hand-punches used for perforating plate metals.

Figure 1:
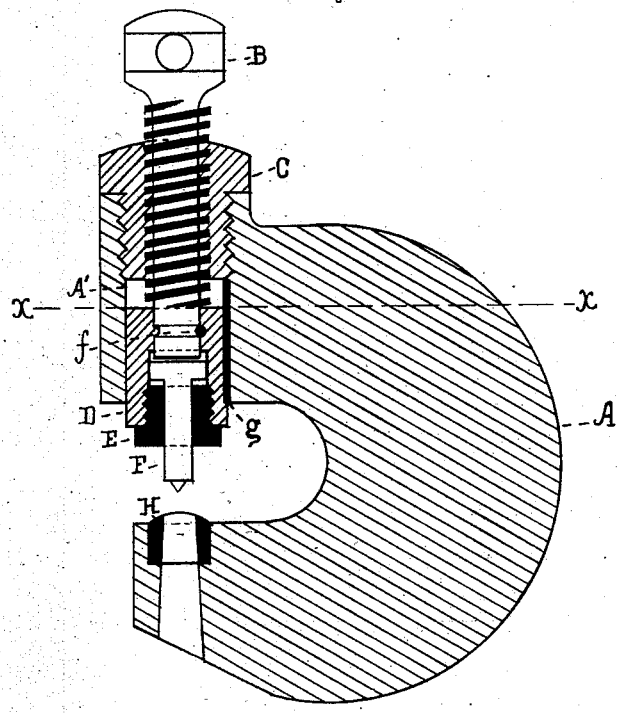
Figure 2:
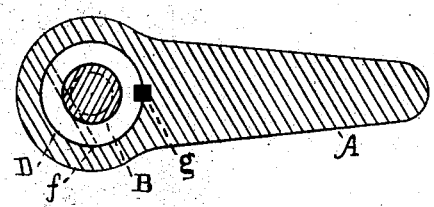
Figure 3:
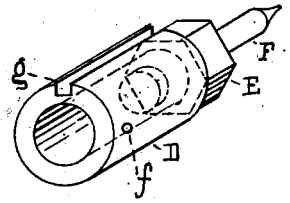

Figure 1 of the accompanying drawings is a sectional elevation, and Fig. 2 a plan on the line $x\ x$, showing the detail of the guide in relation to the guide-chamber; Fig. 3, an elevation of the combined guide and punch.

Similar letters in all the figures refer to similar parts.

I am aware that portable hand-punches are not new among the workers in metal, as it is not unusual at the present day to find in well-equipped boiler-works portable punches working by hydraulic or steam power in addition to those worked by lever or screw by hand. I therefore lay no claim to the particular form which the punch-housing has assumed, it being old; neither do I claim the screw *per se* nor a spline for the purpose of preventing the revolution of the guide D, nor the use of a pin which, by a half-round groove in a spindle, prevents the withdrawal of the same from a recess into which it has passed, as these are all well-known devices for the purpose described; but the combination these parts assume, each small in itself, by which my improvement is made up, adds to and increases the capacity and utility of the ordinary hand-punch to a great extent, enabling more work to be done with less exertion in a given period of time.

Various attempts have been made to improve the common hand-punch, nearly all by the introduction of double or differential screws, (vide Patent No. 52,810, I. F. Allen, apparatus for punching, granted February 27, 1866,) or by the introduction of ratchet-gear, (vide Patent No. 91,400, John Wright, punch, granted June 15, 1869;) but all so far have failed, practically, from the fact that the additions made to the punch to increase the power of the same necessarily made the movement so slow as to prevent their adoption.

By my arrangement I am enabled to use a screw of small diameter, and having the punch to work in a direct line without revolving, (as in the ordinary hand-punch,) I save power by eliminating the friction of the punch occasioned by its revolution as above.

By my arrangement every portion of the punch is easily renewed as wear takes place, whereas with any of the methods of punching where the female screw is in the lug or body of the housing, when the thread becomes worn it can only be repaired by welding on a new lug. This makes, therefore, a useful and economical improvement in hand-punches.

Referring to the drawings, in Fig. 1, A is the housing of the punch; B, the screw, which can be made in proportion to the work to be done and the speed desired.

C is the nut for the screw B, and which is screwed into the head of the housing.

D is the punch-guide, fitting snug into the counterbore A' of the head, and prevented from turning by a key or feather, $g$. The guide has a counterbore at the top for the end of the screw B to enter. The screw B has a groove, $f$, turned on the entering end, which, when inserted in the guide D, corresponds with the hole $f$ in the same, and a pin being inserted retains the guide upon the screw, but does not interfere with its revolution. The guide has the base counterbored to receive the head of the punch, and is threaded below the depth of the head for a screwed retaining and directing plug, E, which is bored to the size of the body of the punch to be used and threaded upon the outside to correspond with the thread in the guide. A punch, F, being slid in the bore of the plug E, it is screwed home in the guide D, the whole being so arranged that when the force is brought to bear upon the screw it shall rest upon the head of the punch and be transferred direct to the metal plate without throwing any strain upon the plug E or pin $f$.

Having described my improvement and its construction, I claim as follows:

The combination, with the stock or housing A of a portable hand-punch, of the screw B, fixed nut C, movable guide D, pin $f$, and annular retaining nut or plug E for the punch F, substantially as shown, and for the purpose described.

G. E. NUEBLING.

Witnesses:
JAMES R. KENNEY,
C. H. DEYSHER.